United States Patent
Ahvenainen

(10) Patent No.: US 6,199,161 B1
(45) Date of Patent: Mar. 6, 2001

(54) MANAGEMENT OF AUTHENTICATION KEYS IN A MOBILE COMMUNICATION SYSTEM

(75) Inventor: Jouko Ahvenainen, Helsinki (FI)

(73) Assignee: Nokia Telecommunication Oy, Espoo (FI)

( * ) Notice: Subject to any disclaimer, the term of this patent is extended or adjusted under 35 U.S.C. 154(b) by 0 days.

(21) Appl. No.: 09/117,133
(22) PCT Filed: Jan. 23, 1997
(86) PCT No.: PCT/FI97/00030
  § 371 Date: Jul. 23, 1998
  § 102(e) Date: Jul. 23, 1998
(87) PCT Pub. No.: WO97/27716
  PCT Pub. Date: Jul. 31, 1997

(30) Foreign Application Priority Data

Jan. 24, 1996 (FI) .................................................. 960325

(51) Int. Cl.$^7$ ................................................ H04L 9/00
(52) U.S. Cl. ................ 713/155; 713/161; 713/168; 713/169; 713/200; 380/278; 380/279; 380/283
(58) Field of Search ............................ 380/278, 279, 380/283; 713/155, 161, 168, 169, 200, 201

(56) References Cited

U.S. PATENT DOCUMENTS

| 5,249,230 | 9/1993 | Mihm, Jr. . | |
| 5,303,285 | 4/1994 | Kerihuel et al. . | |
| 5,943,614 | * 8/1999 | Obayashi et al. | 455/411 |
| 5,970,144 | * 10/1999 | Chan et al. | 380/23 |
| 5,987,137 | * 11/1999 | Karppanen et al. | 380/28 |
| 5,991,407 | * 11/1999 | Murto | 380/23 |
| 6,014,558 | * 1/2000 | Thomas | 455/410 |
| 6,047,066 | * 4/2000 | Brown et al. | 380/2 |

FOREIGN PATENT DOCUMENTS

| 506 637 | 9/1992 | (WO) . |
| 93/07697 | 4/1993 | (WO) . |
| 94/19875 | 9/1994 | (WO) . |

OTHER PUBLICATIONS

"Radio Equipment and Systems (RES); Trans–european Trunked Radio (TETRA); Voice plus Data (V=D); Part 7: Security", European Telecommunication Standard, Sep. 1995, pp. 1–11 and 28–32.

The GSM System, Mobility and Security Management, pp. 478–489.

* cited by examiner

Primary Examiner—Thomas R. Peeso
(74) Attorney, Agent, or Firm—Pillsbury Winthrop LLP; Intellectual Property

(57) ABSTRACT

A method and mobile communication system for managing authentication keys, the system having at least one authentication center, base stations and mobile stations to which subscriber identity modules may be coupled and which communicate with the base stations. The authentication keys are managed by: generating authentication keys and identifiers corresponding thereto, each of which identifiers is independent of a mobile subscriber identity, which allow authentication keys corresponding to the identifiers to be found in the authentication center, storing the authentication keys in the authentication center so that the authentication keys may be found in the authentication center on the basis of the identifiers, and storing the authentication keys and the identifiers corresponding to the authentication keys to the subscriber identity modules.

15 Claims, 2 Drawing Sheets

US 6,199,161 B1

MANAGEMENT OF AUTHENTICATION KEYS IN A MOBILE COMMUNICATION SYSTEM

Figure 1:
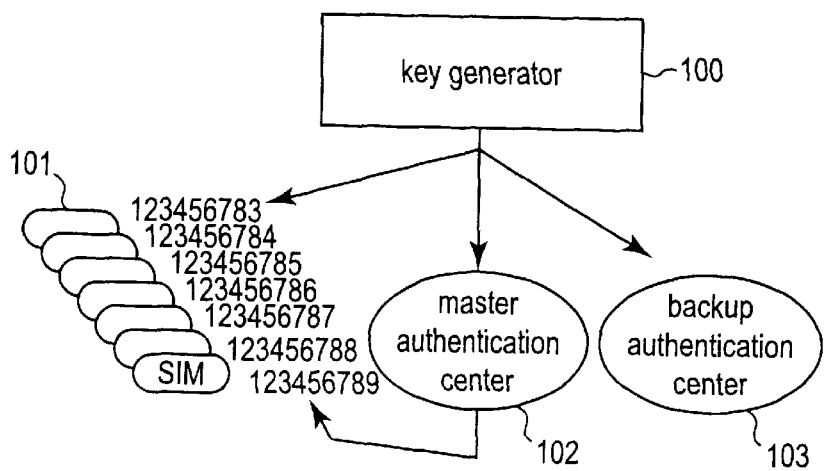

This application is the national phase of international application PCT/FI97/00030, filed Jan. 23, 1997 which designated the U.S.

This application is based on the Finnish patent application No. 960325, filed on Jan. 24, 1996 in the name of Nokia Telecommunications Oy, the contents of which is incorporated hereinto by reference.

BACKGROUND OF THE INVENTION

The invention relates to a method for managing authentication keys in a mobile communication system comprising at least one authentication center, base stations and mobile stations to which subscriber identity modules may be coupled and which communicate with said base stations.

The invention is intended to be applied in mobile communication systems in which subscribers may be identified by means of a subscriber identity module which is either in the mobile stations or may be coupled to it. An example of such a mobile communication system is represented by the GSM system (Global System for Mobiles). Another example of such a mobile communication system is the TETRA radio telephone system (TETRA=Trans European Trunked Radio). The TETRA radio telephone system is an example of the PMR (=Private Mobile Radio) radio telephone system.

The telecommunications network checks a subscriber's identity by carrying out an Authentication Procedure to be sure that the subscriber identity given by the mobile station is correct. By checking the subscriber identity, the network makes it sure that only such subscribers who have the right to use the network services are able to use them. At the same time it is ascertained that an unauthorized user will not cause any extra costs to entitled users or be able to impersonate another subscriber.

In the following, the checking method of a subscriber's identity will be described in more detail by means of a GSM-related example. Similar principles are also applicable to systems of the GSM type and to the Tetra system. The mobile communication system always checks a subscriber's identity in conjunction with registration, call set-up stage and when activating or deactivating certain supplementary services. The subscriber identity is also checked at Location Area (LA) updating in cases the subscriber's roaming number i.e. MSRN (Mobile Station Roaming Number) changes. In other location area (LA) updating instances, the network operator may decide whether to check a subscriber's identity or not.

A subscriber's identity is checked according to the following steps:

Having obtained information of the situation described above, which initiates checking of the subscriber's identity, the mobile communication system, for example its Authentication Center (AUC) transmits a random number RAND to the mobile station, the RAND being generated in the system. Having received the RAND, the mobile station computes, by a specific algorithm, the received RAND, and an Authentication Key K previously stored in the mobile station, a value for an acknowledgment parameter SRES. Hence, the key K is stored at least in the authentication center and the mobile station so that they are both able to compute the same reference numbers. The mobile station sends the acknowledgment parameter SRES to the mobile communication network, in particular to its authentication center, which checks the parameter SRES value, computed in the mobile station, i.e. compares it to the value it has computed, and as a result of this comparison deducts whether the subscriber who transmitted the acknowledgment parameter is an authorized subscriber.

The mobile stations used in mobile communication systems have a subscriber identity and an authentication key stored in a subscriber identity module, which may be attached to the mobile station detachably or integrated therein. The subscriber identity modules which are coupled detachably to the mobile station and which contain the identifiers of the subscribers may, when required, be connected to a terminal equipment to form a mobile station. Such subscriber identity modules and mobile stations to which the subscriber identity module is integrated are usually subscriber-specific and they are identified by a subscriber's secure identifier (IMSI=International Mobile Subscriber Identity or ITSI=Individual Tetra Subscriber Identity). Detachable subscriber identity modules include e.g. SIM cards (SIM=Subscriber Identity Module).

The subscriber identity module described above, such as a SIM card, is subscriber specific, which means that subscriber equipments are not confined to a specific subscriber. The subscriber identity module, such as a SIM card, is a smart card which is placed in the mobile equipment and which contains information, e.g. an authentication key K, required for identifying a subscriber and for encrypting radio traffic. A subscriber identity module, such as a SIM card, in this application refers to a functional card that can be removed from a mobile equipment and by means of which a subscriber is able to use a card controlled mobile equipment.

If a subscriber identity module e.g. a SIM card is employed, the user need not have a mobile equipment of his own, but a subscriber identity module e.g. a SIM card issued to him by the operator of the mobile communication system is all he needs. Such a subscriber identity module is, in a way, a phone card by means of which the subscriber can make (and receive) calls from any mobile equipment of the system. The functions of the SIM card on the one hand include providing the mobile station with data indicating the user in a well protected manner and on the other hand to offer services to the mobile station. Such services may include e.g. maintaining (inputting, changing) a Personal Identification Number (PIN), maintaining the data protection key i.e. the authentication key K, and unblocking by e.g. a PUK code, Personal Unblocking Key, a SIM card blocked by too many attempts of inputting a wrong PIN.

To incorporate a SIM card in hand-held phones, a so-called plug-in-SIM has been introduced as an alternative way of implementing a subscriber identity module. A plug-in-SIM is approximately a coin-sized part containing the electronics of a credit card sized SIM card, and it is placed in a phone so that the user is not able to replace it with ease. The phone may also have an incorporated plug-in-SIM and, in addition, a card reader. If the card reader contains a card, the phone is identified on the basis of the external card, otherwise on the basis of the incorporated plug-in-SIM. Unless the context gives reason to some other interpretation, the term subscriber identity module, such as a SIM card, in this application refers to the plug-in-SIM, the credit card sized smart card SIM, and the subscriber identity module which is incorporated in the mobile station and which contains the subscriber identity and the authentication key K.

In addition to mobile communication systems according to the GSM mobile communication system, the method of the invention is intended for use also in PMR (Private or Professional Mobile Radio) networks, i.e. trunked networks which are typically company networks or public safety and security networks, in which all the channels are used by one or more companies or public authority groups. The security of the networks used by the authorities is set stricter security demands than the normal GSM network.

In the following, the management of the authentication key K is described in normal operation according to the GSM system. When a subscriber acquires a subscriber identity module, for example a SIM card (SIM=Subscriber Identity Module), the subscriber's IMSI, authentication key K and encryption algorithms are stored in the SIM card. The IMSI and the authentication key K are additionally stored in the authentication center AUC of the subscriber's home PLMN (Public Land Mobile Network). Each PLMN comprises one or more authentication centers.

In the GSM system, two key managing methods have been defined. When using the one which is protected better there is no need to transfer the key from a place to another. When employing the method protected worse, the key is transferred within the network, which results in that the method is allowed to be used only when it is not necessary to transfer encrypted information between PLMNs. At other times, the network may decide which one of the methods to employ.

In the following, the safer of these methods is described, i.e. the one in which the subscriber identity is confirmed without transferring the authentication key K. In this method, a suitable network element, e.g. a Base Station (BS) or a Mobile Switching Center (MSC) per each mobile station may request secret subscriber-specific information from the AUC in the home PLMN of the mobile station. The authentication center is either a separate unit or a part of a HLR (Home Location Register). The secret information in this case includes a table of RAND/SRES pairs, which have been obtained by using an algorithm with known values of the parameters RAND and the authentication keys K. The pairs are normally stored in a visitor location register VLR.

Subscriber identification in the Tetra system is described in "prETS 300 392–7, September 1995, Radio Equipment and Systems (RES); Trans-European Trunked Radio (TETRA); Voice plus Data (V+D); Part 7: Security, ETSI, pp. 8–10 and pp. 28–32". In Tetra systems, the authentication key is stored in the mobile communication network in a safe database of a subscriber's home network. In the terminal equipment, in turn, the authentication key may be generated in three different ways, which are described in the aforementioned document. One of the methods for generating the authentication key in the terminal equipment is to use in the authentication a User Authentication Key (UAK) stored in the subscriber equipment.

Carrying out authentication of mobile subscriber securely is the more important the higher level of security is to be achieved in the mobile communication system/network. This matter is also influenced by other solutions of the network: if, for example, the network-internal subscriber number IMSI and the subscriber number MSISDN (Mobile Subscriber International ISDN number) employed by the users are separate, as is the case in the GSM system, flexible use is possible so that the actual subscriber number MSISDN and subscriber data corresponding thereto are defined afterwards for the pair constituted by the allocated IMSI and the authentication key K. This means that it is possible to store in advance the same subscriber identifiers IMSI and the same authentication keys K to the subscriber identity module and the authentication center of the mobile communication system without having to transfer them on a radio path, which is subject to jamming and eavesdropping.

Naturally, it is also possible to define subscriber numbers, such as MSISDN or ITSI numbers, for the subscriber identity modules, e.g. SIM cards, in conjunction with programming the keys. In such a case, distributors would be given cards which have subscriber numbers entered in them, whereas the other subscriber data would only be fed in the system when a new subscriber is defined. A problem here is that subscribers would not have any chance to choose or form a suitable subscriber number which the user finds easy to remember or which would identify that user in some other way, for example by name. Further, this solution does not allow the different levels and fleets of a public authority organization to be described in a systematic manner by means of subscriber numbers of the members of these organizations as it is not possible to know in advance how many new members there will be in the organization, and which hierarchical identifiers to give afterwards to each member of the organization.

A way to solve the problems set forth would be to centralize the generation, subscriber definition and the system authentication i.e. the key database (AUC) of subscriber identity modules e.g. SIM cards to one place. Such centralization of all the key and subscriber management in one location is not, however, a sensible solution from the users' point of view. It must be possible to define new subscribers and to give out SIM cards in several places, for example in public safety and security networks at police stations and alarm receiving centers, and in commercial networks at distributor agencies.

Therefore, the above way of operation would be problematic since in normal mobile communication systems a number of different organizations, e.g. operators, retail dealers of mobile stations as well as service providers wish to provide their clients promptly with subscriber identity modules incorporated in or connected detachably to the mobile station, and with subscriber numbers suitable for the subscribers.

In such a case, a method in which subscriber numbers have been pre-stored in SIM cards is not rational due to its inflexibility. Consequently, a police patrol, for example, could not be issued a number in conjunction with the defining stage, but a number pre-stored on a SIM card, which is somewhere in the distribution chain, has to be chosen.

This feature is particularly manifest in public safety and security networks, because e.g. the TETRA standard does not allow a separate MSISDN number used by subscribers (MSISDN=mobile subscriber international ISDN number) and an IMSI (international mobile subscriber identity) number used network internally.

In addition, in e.g. public safety and security networks, a network may have several groups of public authority users, such as the police, fire brigade, customs, etc., each desiring to distribute and define separate subscriber identity modules for their respective users with the subscriber identifiers in these modules being possible to organize in a hierarchical order, for example fleet by fleet, even after authentication keys have been stored in them.

The authentication keys should not be possible for people to read at any stage, and they should be stored only in connection with the subscriber data of the system and on the SIM card, and they should not be transferred in the network. This means that the keys will have to be generated in a centralized manner in one location both to the system and to the subscriber identity module, such as a SIM card.

BRIEF DESCRIPTION OF THE INVENTION

It is an object of the invention to solve the problems of the prior art solutions.

The aim is to provide a method and system by means of which authentication in mobile communication systems can be arranged as flexibly as possible but nevertheless securely. A further object is to be able, when need be to define, for the subscribers, identifiers that are independent of previous definitions so that each subscriber may, when need be, choose an available subscriber identity without restrictions.

The new method for managing authentication keys in a mobile communication system is obtained by a method according to the invention, which is characterized by the following steps: generating authentication keys and identifiers corresponding thereto by means of which authentication keys corresponding to the identifiers may be found in said authentication center, storing said authentication keys in said authentication center so that said authentication keys may be found in said authentication center on the basis of said identifiers, and storing said authentication keys and said identifiers corresponding thereto to said subscriber identity modules.

The invention further relates to a method for managing authentication keys in a mobile communication system comprising at least one authentication center, base stations, and mobile stations which are provided with identifiers and which communicate with said base stations and to which subscriber identity modules may be connected, as well as at least one subscriber database which stores each subscriber's subscriber data.

The method according to the invention is characterized by comprising the following steps: generating authentication keys and identifiers which correspond to each of them and by means of which an authentication key corresponding to the identifier in question may be found, storing in each subscriber identity module an authentication key to which a specific identifier corresponds, storing said authentication keys in the authentication center of the mobile communication system so that said authentication keys may be found in said authentication center on the basis of said identifiers, and storing said identifier in said at least one subscriber database in association with the subscriber data of said mobile station.

The invention further relates to a method for managing authentication keys in a mobile communication system comprising at least one authentication center, mobile stations to which subscriber identity modules may be coupled, at least one subscriber database for storing subscriber data of a mobile station, and base stations communicating with the mobile stations.

The inventive method is characterized by comprising the following steps: generating, in a centralized manner in one location of the mobile communication system, authentication keys required in the authentication, and identifiers corresponding to the authentication keys, storing said authentication keys in said authentication center so that said authentication keys can be found in said authentication center on the basis of said identifiers, storing the authentication key in a subscriber identity module, storing the mobile subscriber identity in said subscriber identity module following the generating and storing of said authentication keys and said identifiers.

The invention further relates to a mobile communication system comprising at least one authentication center containing authentication keys, base stations, and mobile stations to which subscriber identity modules may be coupled and which communicate with said base stations.

The mobile communication system of the invention is characterized in that it comprises an identifier generating means for generating the identifiers which correspond to the authentication keys required in the authentication and by means of which said authentication keys may be found in said authentication center when authentication is being carried out.

The invention is based on the idea that according to the solution of the invention the cellular network employs an index or an identifier as a pointer to a subscriber's secret authentication key K. The pointer is needed in order to obtain correspondence between the secret authentication keys entered onto the SIM cards and the ones defined in the network. According to the solution, the secret keys used for authentication are programmed simultaneously in the network databases and in the integrated or detachable subscriber identity modules, e.g. SIM cards, so as to prevent anyone seeing the secret keys. In association with the aforementioned programming, each key is in addition provided with an index or identifier by means of which the mobile communication system knows the location of the corresponding key in its databases, for example in an authentication database (AUC) connected to the Home Location Register (HLR). Hence, identifiers are generated for the authentication keys in the database of the mobile communication system. It is consequently enough that when the mobile stations or the network elements desired know these identifiers, the mobile stations may during authentication transmit these identifiers to the mobile communication system. In the mobile communication system, then, the authentication keys are stored in a separate unit which is able to e.g. generate pairs of numbers employed in the authentication process. This signifies that by means of the pointer transmitted by the mobile station or another network element, the authentication center is able to search from its database an authentication key corresponding to each particular subscriber. This means that the authentication may be carried out without transmitting authentication keys on the radio path. The index or pointer given according to the invention may be in the subscriber identity module, e.g. on a SIM card, or it may be a piece of information stored otherwise, for example manually or on paper, to be entered in a subscriber's data, for example in his HLR, upon defining the subscriber.

The method of the invention relates to managing secret keys employed for authenticating subscribers of a radio network in a way in which the keys are generated in a centralized manner in the system and in the subscriber identity modules, for example in SIM cards or subscriber identity modules integrated in mobile stations.

According to the invention, the system employs an index or pointer for pointing to authentication keys in the system. The index may be located in the subscriber identity module, e.g. in a SIM card, or stored in the subscriber database, for example in the subscriber's HLR.

The invention provides the advantage that when operating according to it the authentication keys are not revealed at any stage to the user, and they are not transmitted over the radio path. Instead, they are used e.g. for computing pairs of identification numbers.

The invention provides the further advantage that it enables keeping the authentication keys secret and invisible, but at the same time a smooth distribution of SIM cards to subscribers.

Further still, the invention provides the advantage that subscriber may de defined in a decentralized manner, and also subscriber numbers may be defined in the system freely for the subscribers, and programmed on SIM cards. Nevertheless, the encryption keys will not have to be transferred without encryption in the system or with a SIM card. The method consequently combines flexible usability with high level of security.

Further still, the invention provides the advantage that the system or SIM cards need not have any functions by means of which to read out the authentication key. The key is only entered once both into the subscriber identity module and the authentication center of the mobile communication system, and it is thereafter used in internal computing in the authentication center and the subscriber identity module, such as a SIM card.

The index number in a mobile communication system of the invention needs to be system internal only, and therefore it does not have to be taken into account when carrying out numbering or air interface signalling.

The invention provides the advantage that divulging of the index number according to the invention in a subscriber identity module such as a SIM card does not constitute a threat to security as the divulging does not benefit an unauthorized user in any way in his unauthorized attempts to be authenticated and registered into the mobile communication system.

The invention provides the further advantage that the subscriber identity modules, e.g. SIM cards, and keys do not have to be programmed in the same place. The authentication keys may also be transferred in both directions via an intermediate device, e.g. a card or computer. In such a case, it is possible to generate distribution cards containing several authentication keys, and to use the distribution cards to transfer keys to locations in which the actual distribution to subscribers is carried out. The data on such distribution cards must naturally be protected equally well as the data in the system and on the SIM card. The distribution cards are provided with index numbers of all the cards to be programmed from it.

It must further be taken into account that the method need not be used in association with SIM cards as a similar arrangement is also possible in a system with integral subscriber identity modules in the mobile stations and in systems in which the subscriber identity modules with their subscriber identities form an integral part of the mobile station or its memory.

LIST OF DRAWINGS

Figure 2:
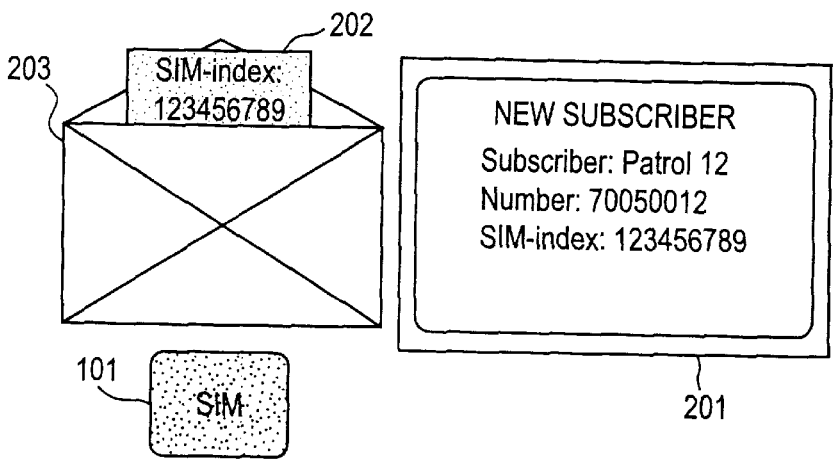
Figure 3:
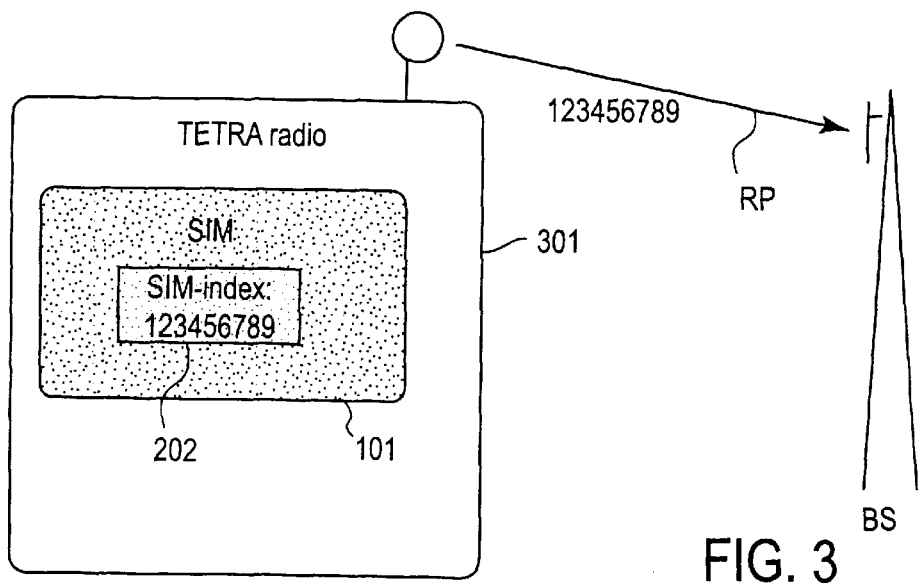
Figure 4:
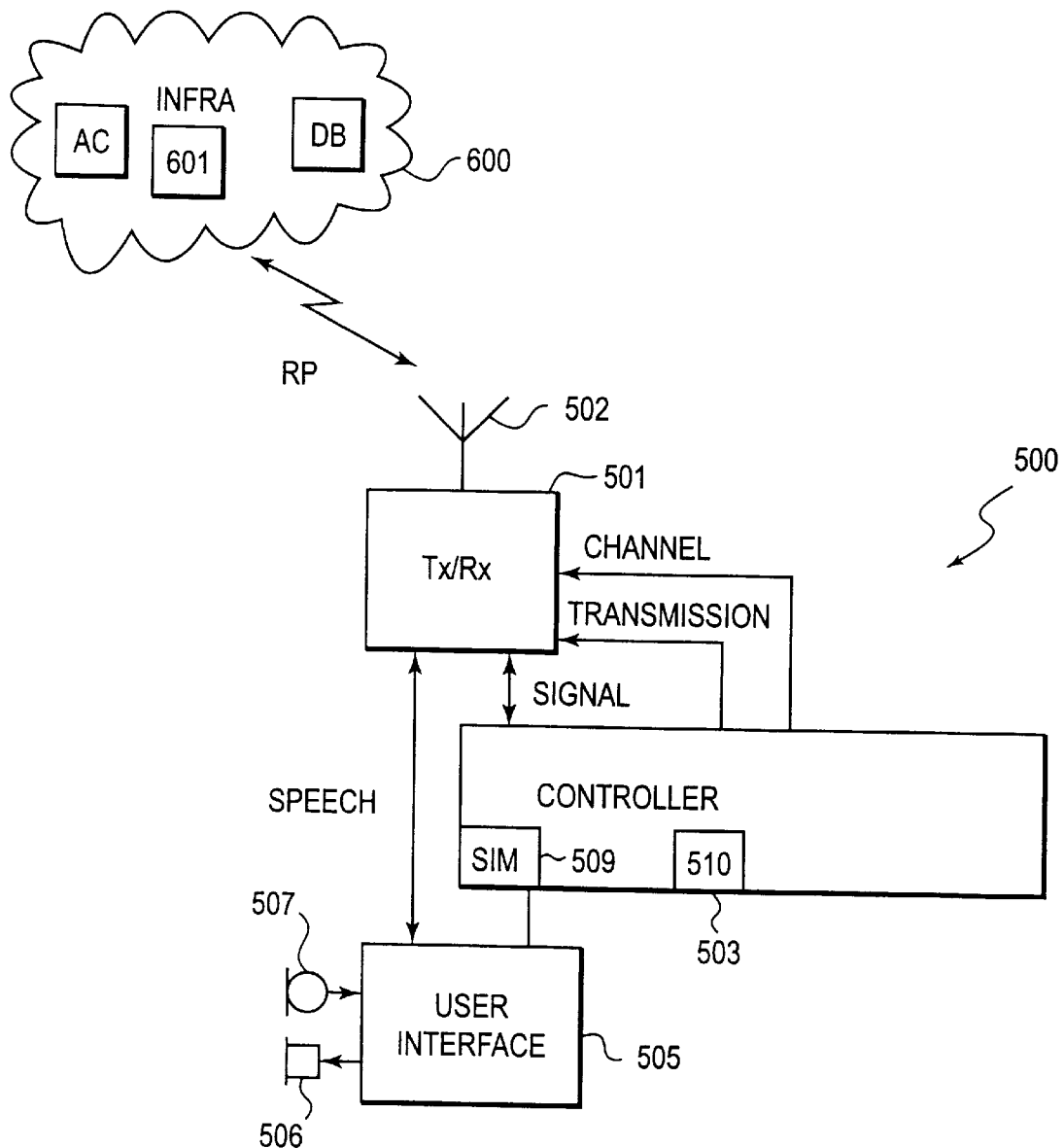

The invention is in the following described in more detail with reference to the attached drawings, in which FIG. 1 shows centralized generation of authentication keys according to the invention in a mobile communication system, FIG. 2 shows the method according to the invention for defining a subscriber, FIG. 3 shows an embodiment of the invention in which the identifier according to the invention is transmitted on the radio path, and FIG. 4 is a block diagram illustration of a mobile communication system according to the invention and a mobile station therein.

DETAILED DESCRIPTION OF THE INVENTION

FIG. 1 shows generation according to the invention of an authentication key in a centralized place in the mobile communication system. According to the invention, the mobile communication system/network comprises a centralized place—a key generator 100—in which the authentication keys are generated and programmed in the memories of authentication centers in the system and on the SIM cards. In practice, it is worth while, but not necessary, to generate a larger number of authentication keys at the same time. Each key will be provided with an identifier, such as an index number, which points to the location of the key in the system. The figure in addition shows a master authentication center 102 in which the actual authentication takes place. The mobile communication system may additionally have another authentication center in reserve, i.e. a backup authentication center 103.

According to the first embodiment of the invention, when registering a mobile station or its user, an identifier stored in a subscriber identity module SIM, 101 according to the invention is transmitted from the mobile station being discussed to a base station BS of the mobile communication system. Following this, on the basis of said identifier, an authentication key corresponding to said identifier 202 will be searched from an authentication center AUC,102. On the basis of the identifier 202, the authentication desired is carried out by means of the authentication key retrieved.

According to a second embodiment of the invention, when registering a mobile station or its user, an identifier in accordance with the invention, which is stored in a subscriber database DB, is transmitted during the authentication process to the authentication center 102, AUC. Following this, the authentication is carried out by means of the authentication key retrieved on the basis of said identifier.

It should be noted that by means of said authentication key it is possible to authenticate either a mobile station or its user, or the mobile communication system. The mobile station transmits an enquiry comprising a RAND and a pointer to the network. By means of the pointer, the system finds the correct key K, and by using the RAND computes a result which has to be the same as the one computed in the mobile station. If that is not the case, a wrong network is in question.

FIG. 2 shows a method according to the invention for defining a subscriber in a mobile communication system. The subscriber receives a SIM card, 101, and his subscriber data are defined in the system, for example in a subscriber database 201 of the system. The authentication key index i.e. the identifier 202 supplied with the card is defined in the subscriber data. According to this solution, then, information on the index i.e. the identifier 202 is external to the SIM card 101, for example on a separate piece of paper, e.g. in a letter 203.

FIG. 3 shows an implementation according to an embodiment of the invention, in which the index in accordance with the invention is transmitted over the radio path RP from a mobile station 301 to the base station BS. According to this solution, the index i.e. identifier 202 of the invention is on a SIM card 101, and therefore it is transferred for example in conjunction with registration or authentication over the radio path RP to the base station BS and further to other parts of the mobile communication system, e.g. to its authentication center 102 (FIG. 1). The authentication may also be implemented so that it is provided with exchange of messages, in which said identifier is transferred to be known by the mobile communication system and stored permanently in its database, from which it may be picked up when a subscriber later registers in the system and when authentication is being carried out.

After the subscriber identities have been generated, the system knows the subscriber and is able, on the basis of the identifier, to employ the correct authentication key. The authentication center AUC, 102 of the system, may be placed in connection with the Home Location Register (HLR) of the subscriber. When authenticating a subscriber, the system is on the basis of the identifier able to find the correct authentication center. Further, within the authentication center, the system is on the basis of the identifier able to request a pair of authentication numbers corresponding to said subscriber, by means of which the mobile station, subscriber or mobile communication system in question may be authenticated.

FIG. 4 is a block diagram illustration of a radio unit according to the invention. The figure shows the network infrastructure (INFRA) 600 of the mobile communication system. The network infrastructure comprises e.g. base stations BS (FIG. 3), exchanges and other telecommunication devices as well as subscriber databases, such as a Home Location Register (HLR) and a Visitor Location Register (VLR), and an authentication center (AUC).

The mobile communication system of the invention further comprises an identifier generating means 601 for generating identifiers 202 which correspond to the authentication keys required in the authentication process and on the basis of which said authentication keys may be found in said authentication center 102, AUC when authentication is being carried out.

FIG. 4 shows a typical radio unit 500 communicating in the mobile communication system, such as a subscriber-operated mobile phone, a mobile station or a subscriber station. The function of the transceiver unit (TX/RX) 501 is to match onto the radio channel employed on any one occasion, by means of which the mobile station communicates with the network infrastructure typically via the base station BS (FIG. 3). An antenna 502 is connected to the transceiver 501, the antenna having connection to the radio path RP. Usually, radio frequencies between the range 60–1000 MHz (VHF and UHF bands) are used, although other frequencies can also be used. On the radio path RP, either analog or digital modulation may be employed.

The user interface 505 comprises an electroacoustic transducing means, typically a loudspeaker 506 and a microphone 507, and possibly buttons relating to beginning, ending and dialling a call. In trunked systems, the subscriber unit typically contains a push to talk button (PTT) which must be kept pressed down for the duration of the speaking turn.

The purpose of a controller 503 is to control the operation of the radio unit. The controller 503 is connected to the user interface 505, from which it obtains impulses relating to, for example, the call initiation and termination. Through the user interface 505, the controller 503 may also provide the user with voice/sound or visual symbols relating to the operation of the mobile phone or the mobile radio system.

The controller 503 is connected to the transceiver TX/RX 501. The channel employed by the transceiver is defined by the controller 503, meaning that the transceiver tunes onto a channel, i.e. radio frequency and an appropriate time slot, determined by the controller 503. The transceiver is also turned on controlled by the controller 503. The controller 503 receives and transmits signalling messages by means of the transceiver 501. A radio unit 500 according to the invention, may be used, for example, in a mobile communication system, i.e. a radio system, comprising a radio network which has at least one base station BS and subscriber stations, and possibly one or more repeater stations. Said radio unit contains a transceiver unit 501 for receiving transmissions transmitted by other radio units, and for transmitting the transmissions to said other radio units, a control unit 503 for controlling the radio unit functions, and a user interface 504.

The mobile station 500 according to the invention comprises a subscriber equipment which may be provided with a subscriber identity module. The subscriber equipment consists of the transceiver unit 501, the controller 503 and the user interface 505. The mobile station further comprises a unique subscriber identity module 509, e.g. a SIM card, which is detachably connected to the subscriber equipment, thus forming a mobile station.

The mobile station according to the invention comprises a transmitting means 510 for transmitting identifiers, on the basis of which authentication keys used in the authentication process may be found in the authentication center AUC, from the mobile station to the mobile communication system.

The drawings and the description related thereto are only intended to illustrate the idea of the present invention. The invention may vary in details within the scope of the claims. Although the invention is described above mainly in relation to the GSM and TETRA mobile communication systems, the invention is also applicable to other kinds of mobile communication systems, particularly in those based on the GSM and TETRA mobile communication systems.

The invention may be implemented either by inserting the index i.e. the identifier in the subscriber identity module (the SIM card, 509), which is either integral to the mobile station or a removable SIM card, or by programming the identifier in the system in one of its databases in connection with the subscriber data. In the former method, the index must if need be transferred over the radio interface to the system. In the latter method, information of the identifier must be somehow written down, e.g. on a piece of paper, in conjunction with storing the authentication key in the subscriber identity module, so that it can be associated with the subscriber data when entering the subscriber of the subscriber identity module e.g. a SIM card in the system.

Out of the alternative methods disclosed, a more useful is the one employing SIM cards. This results from the fact that to fix the subscriber identity module integrally to the mobile station would be rather difficult as it would require cooperation between various manufacturers and operators.

What is claimed is:

1. A method for managing authentication keys in a mobile communication system comprising at least one authentication center, base stations and mobile stations to which subscriber identity modules may be coupled and which communicate with said base stations, the method comprising the following steps:

generating authentication keys and identifiers corresponding thereto each of which identifiers is independent of a mobile subscriber identity, by means of which authentication keys corresponding to the identifiers may be found in said authentication center, storing said authentication keys in said authentication center so that said authentication keys may be found in said authentication center on the basis of said identifiers, and storing said authentication keys and said identifiers corresponding to the authentication keys to said subscriber identity modules.

2. The method as claimed in claim 1, the method further comprising the steps of:

transmitting said identifier stored in said subscriber identity module from said mobile station to a base station of the mobile communication system, retrieving, on the basis of said identifier, an authentication key corresponding to said identifier from said authentication center, carrying out authentication by means of the authentication key retrieved on the basis of said identifier.

3. The method as claimed in claim 2, wherein said mobile station or the subscriber using it is authenticated by means of said authentication key.

4. The method as claimed in claim 2, wherein said mobile communication system is authenticated by means of said authentication key.

5. A method for managing authentication keys in a mobile communication system comprising at least one authentication center, base stations, and mobile stations which are provided with identifiers and which communicate with said base stations and to which subscriber identity modules may be connected, as well as at least one subscriber database which stores each subscriber's subscriber data, the method comprising the following steps:

generating authentication keys and identifiers corresponding thereto, each of which identifiers is independent of a mobile subscriber identity, by means of which an authentication key corresponding to the identifier in question may be found in said authentication center, storing in each subscriber identity module an authentication key to which a specific identifier corresponds, storing said authentication keys in the authentication center of the mobile communication system so that said authentication keys may be found in said authentication center on the basis of said identifiers, and storing said identifier in said at least one subscriber database in association with the subscriber data of said subscriber.

6. The method as claimed in claim 5, the method further comprising the steps of:

sending, when carrying out authentication, said identifier stored in said subscriber database to said authentication center, retrieving, on the basis of said identifier, the authentication key corresponding thereto from said authentication center, and carrying out authentication by means of the authentication key retrieved on the basis of said identifier.

7. The method as claimed in claim 6, wherein said mobile station or the subscriber using it is authenticated by means of said authentication key.

8. The method as claimed in claim 6, wherein said mobile communication system is authenticated by means of said authentication key.

9. A method for managing authentication keys in a mobile communication system comprising at least one authentication center, mobile stations to which subscriber identity modules may be coupled, at least one subscriber database for storing subscriber data of a mobile station, and base stations communicating with the mobile stations, the method comprising the following steps:

generating, in a centralized manner in one location of the mobile communication system, authentication keys required in the authentication, and identifiers corresponding to the authentication keys, each of which identifiers is independent of a mobile subscriber identity, storing said authentication keys in said authentication center so that said authentication keys may be found in said authentication center on the basis of said identifiers, storing one of the authentication keys in a subscriber identity module, storing the mobile subscriber identity in said subscriber identity module following the generating and storing of said authentication keys and said identifiers.

10. The method as claimed in claim 9, wherein storing said identifier generated in connection with generating said authentication keys at the same time also in the same subscriber identity module with the authentication key corresponding to said identifier.

11. The method as claimed in claim 10, wherein storing, for pointing to the authentication key stored in said authentication center of the mobile communication system, the subscriber identity and said identifier associated with it in the subscriber database of the mobile communication system simultaneously with storing said subscriber identity in said subscriber identity module.

12. The method as claimed in claim 10, wherein sending, for pointing to the authentication key stored in the authentication center of the mobile communication system, the subscriber identity and said identifier stored in the subscriber identity module from the mobile station to the mobile communication system.

13. The method as claimed in claim 9, wherein attaching said identifier generated in connection with generating the authentication keys to the subscriber identity module to which the authentication key corresponding to said identifier is stored, so that said identifier is available when the subscriber identity is stored in the subscriber database.

14. The method as claimed in claim 13, wherein storing, in the subscriber database of the mobile communication system, the subscriber identity and said identifier associated with said subscriber identity as previously attached to said subscriber identity module in order to point to the authentication key stored in the authentication center of the mobile communication system simultaneously with storing said subscriber identity in said subscriber identity module.

15. A mobile communication system comprising at least one authentication center containing authentication keys, base stations and mobile stations which communicate with said base stations and to which subscriber identity modules may be coupled, comprising an identifier generating means for generating identifiers, each of which identifiers is independent of a mobile subscriber identity, and which correspond to the authentication keys required in the authentication and on the basis of which said authentication keys may be found in said authentication center when authentication is being carried out.

* * * * *

UNITED STATES PATENT AND TRADEMARK OFFICE
CERTIFICATE OF CORRECTION

PATENT NO. : 6,199,161 B1
DATED : May 18, 2001
INVENTOR(S) : Ahvenainen

Page 1 of 1

It is certified that error appears in the above-identified patent and that said Letters Patent is hereby corrected as shown below:

Please correct the title pages to read as follows:

[73] Assignee: Nokia Telecommunications Oy (Espoo, FI)

Signed and Sealed this

Twentieth Day of November, 2001

Attest:

*Nicholas P. Godici*

NICHOLAS P. GODICI
*Attesting Officer*   *Acting Director of the United States Patent and Trademark Office*